United States Patent
Kato

(10) Patent No.: US 7,390,425 B2
(45) Date of Patent: Jun. 24, 2008

(54) FERRITE SINTERED BODY AND METHOD OF MANUFACTURING SAME

(75) Inventor: Tomotsugu Kato, Saitama (JP)

(73) Assignee: Hitachi Metals, Ltd., Tokyo (JP)

( * ) Notice: Subject to any disclaimer, the term of this patent is extended or adjusted under 35 U.S.C. 154(b) by 292 days.

(21) Appl. No.: 11/363,287

(22) Filed: Feb. 28, 2006

(65) Prior Publication Data
US 2006/0219974 A1 Oct. 5, 2006

(30) Foreign Application Priority Data
Mar. 31, 2005 (JP) .............................. 2005-101898
Jun. 29, 2005 (JP) .............................. 2005-189734

(51) Int. Cl.
*H01F 1/34* (2006.01)
(52) U.S. Cl. ................ 252/62.63; 252/62.61; 252/62.59
(58) Field of Classification Search .............. 252/62.63, 252/62.61, 62.59
See application file for complete search history.

(56) References Cited

U.S. PATENT DOCUMENTS 5,954,992 A * 9/1999 Onizuka et al. .......... 252/62.63
6,623,879 B2 * 9/2003 Okano et al. ................ 428/701

FOREIGN PATENT DOCUMENTS

| JP | 50-32207 | 3/1975 |
| JP | 9-110432 | 4/1997 |
| JP | 9-129433 | 5/1997 |
| JP | 10-92624 | 4/1998 |
| JP | 2001-39718 | 2/2001 |
| JP | 2002-362968 | 12/2002 |
| JP | 2003-2656 | 1/2003 |

* cited by examiner

Primary Examiner—C. Melissa Koslow
(74) Attorney, Agent, or Firm—McGinn IP Law Group, PLLC

(57) ABSTRACT

The ferrite sintered body of hexagonal Z-type ferrite contains 17 mol % to 21 mol % of BaO, 6 mol % to 13 mol % of CoO, the remainder being $Fe_2O_3$ as its main components and also contains 0.05% to 1.0% by mass of Li, based on the main components, in terms of $Li_2CO_3$ and 0.05% to 0.5% by mass of Si, based on the main components, in terms of $SiO_2$. Further, the rate of a spinel-type ferrite phase to entire phases including a Z-type ferrite phase and the spinel-type ferrite phase is 5% or less in terms of an area ratio in the cross section of the sintered body.

18 Claims, 5 Drawing Sheets

FERRITE SINTERED BODY AND METHOD OF MANUFACTURING SAME

BACKGROUND OF THE INVENTION

1. Field of the Invention

The present invention relates to a magnetic material used in a high-frequency application and more particularly to a sintered body of hexagonal Z-type ferrite that can be used in electronic components such as a choke coil, a noise suppressing device, or the like, and/or in an electromagnetic wave absorber, in a high-frequency band between several MHz and several GHz.

2. Description of the Related Art

As the use of a portable phone, a wireless LAN (Local Area Network), a personal computer in high frequency bands increases in recent years, it becomes necessary that elements or components themselves mounted within electronic products can also operate in the high-frequency environments. However, despite these demands, conventional spinel ferrite cannot be used in the high-frequency bands due to the frequency limit called Snoek's limit. To solve this problem, hexagonal ferrite having an easy magnetization plane and a hexagonal crystal structure is under review so as to be used as a material that can overcome the frequency limit problem and can be used in high-frequency applications. It is known that the hexagonal Z-type ferrite containing Co in particular, among the hexagonal ferrite products, has comparatively high initial permeability and exhibits excellent high-frequency characteristics. When the hexagonal ferrite is to be used in electronic components such as coil components or the like, it is necessary that the hexagonal ferrite has high volume resistivity from the viewpoint of obtaining insulating property, in addition to the high initial permeability and excellent frequency characteristics.

To respond to the demands above, hexagonal Z-type ferrite that can be suitably used in inductance elements is disclosed in Japanese Patent Application Laid-open No. Hei 9-110432 which is manufactured by making Si (silicon) and Ca (calcium) be contained therein. Also, Japanese Patent Application Laid-open No. Hei 9-129433 describes that high-frequency characteristics can be improved by addition of Si and Ca.

Also, Japanese Patent Application Laid-open No. Hei 10-92624 describes that hexagonal ferrite having high resistivity can be manufactured by making Si and Pb or the like, in addition to oxides serving as main components, be contained therein to vitrify $SiO_2$ and PbO. Similarly, Japanese Patent Application Laid-open No. 2001-39718 describes a high resistance effect and a method in which an oxide magnetic material being excellent in magnetic characteristics in high-frequency bands and having high specific resistance can be manufactured by performing a sintering operation after both $Bi_2O_3$ and $Mn_3O_4$ have been added simultaneously following a calcination process.

Japanese Patent Application Laid-open No. 2002-362968 describes a method of manufacturing ferrite with high resistance without using any additive in which ferrite having high specific resistance can be obtained by providing a low-cooling-rate region in cooling steps of sintering processes in which a cooling rate is 0° C./min or higher and less than 1° C./min. Moreover, Japanese Patent Application Laid-open No. 2003-2656 describes that resistance is made higher by blending 1% to 10% by mass of barium carbonate or strontium carbonate or both of them or 0.5% by mass of $SiO_2$. Furthermore, Japanese Patent Application Laid-open No. Sho 50-32207 describes that a temperature characteristic of initial permeability can be improved by substituting $Co^{3+}$ and $Li^+$ for part of divalent ions of Z-type ferrite.

However, in the conventional hexagonal ferrite disclosed in the above references, it is impossible to manufacture hexagonal ferrite being excellent in high-frequency characteristics which can achieve both desired high permeability and desired high volume resistivity. That is, a ferrite sintered body of the conventional hexagonal Z-type ferrite cannot provide sufficiently satisfactory characteristics.

SUMMARY OF THE INVENTION

In view of the above, it is an object of the present invention to provide a ferrite sintered body having a high density (hereinafter, "density" refers to a density of a sintered body.) and being excellent in initial permeability, high-frequency characteristics, volume resistivity and a method for manufacturing the above ferrite sintered body.

According to an aspect of the present invention, there is provided a ferrite sintered body of hexagonal Z-type ferrite containing:

17 mol % to 21 mol % of BaO, 6 mol % to 13 mol % of CoO, and the remainder being $Fe_2O_3$ as its main components:

0.05% to 1.0% by mass of Li, based on the main components, in terms of $Li_2CO_3$; and 0.05% to 0.5% by mass of Si, based on the main components, in terms of $SiO_2$.

That is, by making Li and Si be contained in the sintered body in combination, the hexagonal Z-type ferrite having high initial permeability, high density, high volume resistivity can be provided.

Besides, a configuration "the ferrite sintered body of hexagonal Z-type ferrite" does not mean a ferrite sintered body consisting only of hexagonal Z-type ferrite. In other words, the configuration "the ferrite sintered body of hexagonal Z-type ferrite" may include another phases, such as spinel-type ferrite phase, or the like. Hereinafter, the configuration will be used by the same meaning. Further, configurations, such as "17 mol % to 21 mol %" mean "between 17 mol % and 21 mol %, both inclusive" and so on. Hereinafter, such configurations including "to" will be used by the same meaning.

In the foregoing, a preferable mode is one wherein the rate of a spinel-type ferrite phase to entire phases consisting of a Z-type ferrite phase and the spinel-type ferrite phase in the ferrite sintered body is 5% or less in terms of an area ratio in a cross-section of the ferrite sintered body.

That is, by making Li and Si be contained and by making the ratio of the spinel-type ferrite phase fall within the range described above, the hexagonal Z-type ferrite having high initial permeability and high density can be obtained. The ratio of the spinel-type ferrite phase to entire phases consisting of the Z-type ferrite phase and spinel-type ferrite phase in the sintered body is calculated as an area ratio of the spinel-type ferrite phase to areas of entire phases consisting of the Z-type ferrite phase and spinel-type ferrite phase, which is obtained by performing mirror polishing on a cross section of the sintered body and identifying and observing of the phase in an observation image of a magnification 1000 times using an SEM (Scanning Electron Microscope)/EDX (Energy Dispersive X-ray Fluorescence Spectrometer).

Also, a preferable mode is one wherein the main components contain 18.2 mol % to 19.8 mol % of BaO, 8 mol % to 11.5 mol % of CoO, and the remainder being $Fe_2O_3$.

That is, by making the composition of main components fall within the range described above, generation of the spinel-type ferrite phase can be suppressed.

Also, a preferable mode is one wherein a density is 4.95× $10^3$ kg/m³ or more.

That is, by making Li and Si be contained, the density of 4.95×$10^3$ kg/m³ or more can be obtained and the ferrite sintered body having high permeability and high strength can be provided.

Also, a preferable mode is one wherein an average crystal grain diameter of a cross section of the sintered body is 20 μm or more.

That is, by making the average crystal grain diameter of the sintered body fall within the range described above, in addition to the effect of obtaining a high density by making Li be contained, the effect of obtaining high initial permeability is exerted. The average crystal grain diameter represents a value obtained by dividing a length of a line segment on a drawn straight line being equivalent to 1 mm, by the number of crystal grains, in a microscopic observation image of a cross section of the sintered body having undergone mirror polishing and etching. If an end of the line segment disappears in a crystal grain, the grain is counted as 0.5 pieces.

Also, a preferable mode is one wherein initial permeability μi at a frequency of 100 kHz is 14 or more.

That is, by making Li and Si be contained to achieve high density, the initial permeability of 14 or more at the frequency of 100 kHz can be obtained. The hexagonal Z-type ferrite is originally excellent in high frequency characteristics, which serves to provide high performance to electronic devices using it. Moreover, in the present invention, unless otherwise specified, the value of the initial permeability is one that is obtained at the frequency of 100 kHz.

Also, a preferable mode is one wherein the ferrite sintered body contains 0.05% to 5% by mass of Mn, based on the main components, in terms of $Mn_3O_4$.

That is, containing of Mn can serve to maintain high resistance and also to exert the effect of improving the initial permeability.

Also, a preferable mode is one wherein initial permeability μi at a frequency of 100 kHz is 15 or more and volume resistivity ρ is $10^4$ Ω·m or more.

That is, such the sintered body as described above can be suitably used in electronic components operating in high frequency applications.

According to another aspect of the present invention, there is provided a method of manufacturing a ferrite sintered body including:

a calcination process to calcine mixed raw material powder;

a pulverizing process to pulverize calcined powder obtained in the calcination process;

a forming process to form pulverized powder obtained in the pulverizing process; and a sintering process to sinter green compacts obtained in the forming process so that a sintered body of hexagonal Z-type ferrite is obtained;

wherein the ferrite sintered body contains 17 mol % to 21 mol % of BaO, 6 mol % to 13 mol % of CoO, the remainder being $Fe_2O_3$ as its main components and contains 0.05% to 1.0% by mass of Li, based on the main components, in terms of $Li_2CO_3$ and 0.05% to 0.5% by mass of Si, based on the main components, in terms of $SiO_2$ and wherein the calcination process is performed at temperatures of 950° C. to 1150° C.

That is, by performing the calcination at the temperature within the range described above, the generation of the spinel-type phase can be suppressed and high permeability can be achieved.

In the foregoing, a preferable mode is one wherein the calcined powder obtained in the calcination process has substantially two phases consisting of a hexagonal M-type ferrite phase and a hexagonal Y-type ferrite phase.

That is, by making the calcined powder have the hexagonal M-type ferrite phase and the hexagonal Y-type ferrite phase, the initial permeability of the ferrite sintered body of the hexagonal Z-type ferrite phase obtained through the calcination process can be improved. Moreover, the fact that the calcined powder obtained in the calcination process has substantially two phases consisting of the hexagonal M-type ferrite phase and the hexagonal Y-type ferrite phase indicates that a peak of any phase other than the above two phases is not observed in the powder X-ray diffractometry.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Figure 1:
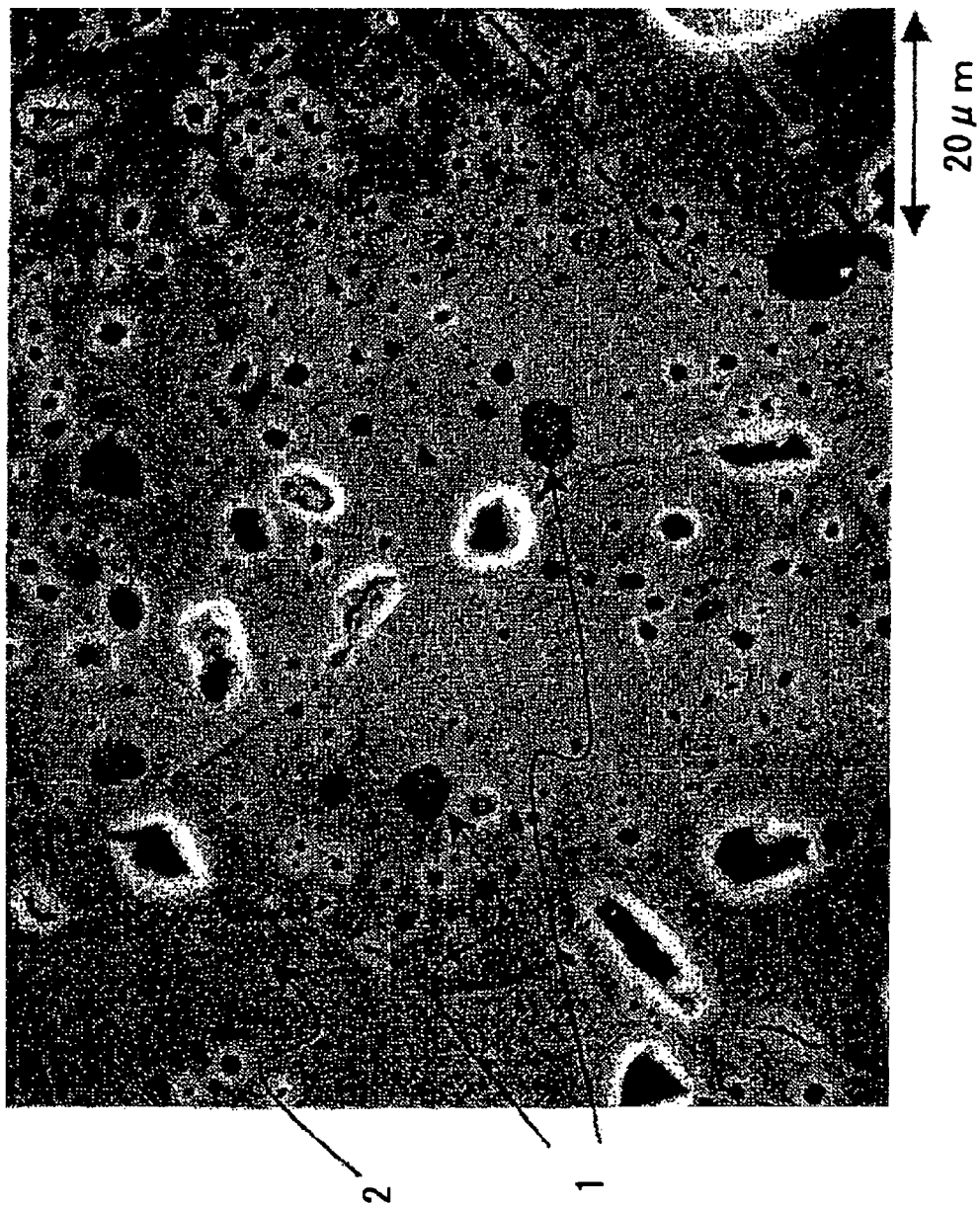
FIG. 1 is an SEM (Scanning Electron Microscope) observation photograph according to the embodiment of the present invention.

Best modes of carrying out the present invention will be described in further detail using various embodiments with reference to the accompanying drawings. Hereinafter, the present invention is explained by embodiments, however, the present invention is not limited to the embodiments. The ferrite sintered body of the present invention can be manufactured by an ordinary powder metallurgical method being applied to manufacturing of ferrite unless otherwise described in the present invention. That is, a raw material is mixed in a wet ball mill and is calcined by using an electric furnace or the like to obtain a calcined powder. Then, the obtained calcined powder is pulverized using the wet ball mill or the like and the obtained pulverized powder is formed using a press machine and is sintered using, for example, an electric furnace to produce a ferrite sintered body of hexagonal Z-type ferrite.

In the case of a ferrite sintered body of hexagonal Z-type ferrite, even if sintering is performed within a temperature range in which a Z phase is easily produced, it is difficult to obtain sufficient initial permeability. This is because sufficient sintering does not progress in the temperature range in which the Z phase is easily generated and the density of sintered body is low. On the contrary, if sintering is performed in a high temperature range, generation of the Z phase is difficult and secondary phases such as a W phase and/or $BaFe_2O_4$ phase are generated, causing characteristics of ferrite to be remarkably degraded. Therefore, in order to obtain a ferrite sintered body of hexagonal Z-type ferrite with high initial permeability, it is necessary that sufficiently high density is obtained.

The inventor of the present invention has found that, in order to obtain high density, to make Li be contained in ferrite is effective in particular. That is, by making 17 mol % to 21 mol % of BaO, 6 mol % to 13 mol % of CoO, and the remainder being $Fe_2O_3$ be contained as main components and by making 0.05% to 1.0% by mass of Li in $Li_2CO_3$ terms of be contained in the main components, even in the sintering temperature range in which Z phase was generated easily but high density was hard to achieve, it is possible to make the density be high. The inventor's guess is that this is because Li acts as a sintering assistant which, as a result, has improved the density.

It is possible that the density is made high by using the above main components within the composition range described above and making Li be contained in the main components. However, the inventor has found that, containing of Li, though being effective in improving the sintered body density, does not simply improve initial permeability in some cases. That is, it is being gradually understood that one reason is that, by making Li be contained, grain size of a sintered body is made small, though why such a phenomenon occurs is not entirely clear. Due to this, when Li is made to be contained singly, as Li content increases, though the density is made high, initial permeability is lowered.

The inventor further has found that, by making Li and Si be contained in combination, the initial permeability is improved greatly and behavior of Li content dependency of initial permeability changes much. That is, when Si is made to be contained, unlike in the case where Li is made to be singly contained, there appears a tendency that, as the Li content increases, the initial permeability also increases. The inventor has acquired knowledge that, when Li together with Si is made to be contained in combination, a specific synergy effect of improvement of the density and of initial permeability can be obtained. When Li and Si are made to be contained in a combined manner, crystal grain size has become large, which is assumed to be the reason for the effect. When Li is contained, from the viewpoint of obtaining high permeability, it is preferable that the crystal grain size is large. Moreover, from the viewpoint of achieving Li containing effect and of obtaining initial permeability being 14 or more, it is preferable that an average crystal grain diameter is 20 µm or more. On the other hand, the reason why Si can improve initial permeability is assumed to be that Si facilitates active diffusion of component elements and promotes growth of crystal grains during the process in which Si segregates in a grain boundary portion. Also, the containing of Si is attributable to the improvement of volume resistivity. It is assumed that this has occurred due to the reason that the segregated Si has generated a high-resistive grain boundary layer and has improved volume resistivity of an entire sample. That is, the containing of Si is attributable to an increase in resistivity of an entire ferrite sintered body promoted by an increase in a grain boundary resistance. Even when a small amount of Si is contained together with Li, Si exhibits an effect exerted by making Si and Li be contained in a combined manner and an effect of increasing volume resistivity. However, if less than 0.05% by mass of Si in terms of $SiO_2$ is contained, the above effects are not substantially exerted. In contrast, if the content of Si exceeds 0.5% by mass in terms of $SiO_2$, the volume resistivity comes not to be improved and a decrease in initial permeability and density occurs and, therefore, a range of the Si content is preferably 0.05% to 0.5% by mass in terms of $SiO_2$. By making Li and Si of the above content be contained in combination, the sintered body density is made to be $4.95 \times 10^3$ $kg/m^3$ or more and the volume resistivity is made to be $10^4$ $\Omega \cdot m$ or more and the effect of improving initial permeability by containing Li can be exerted. Moreover, to prevent the occurrence of exaggerated grains caused by excessive sintering, the Si content range of 0.05% to 0.2% by mass in terms of $SiO_2$ is more preferable.

Thus, by making Li and Si be contained in combination, it is made possible to achieve the growth of sufficient crystal grains and, by making Li be contained, not only the improvement of the density but also the maintenance and improvement of initial permeability are made possible. However, if the Li content is less than 0.05% by mass in terms of $Li_2CO_3$, substantial effects cannot be obtained. Also, if the Li content exceeds 1.0% by mass in terms of $Li_2CO_3$, excessive sintering occurs easily and, on the contrary, a decrease in the initial permeability becomes large. By making 0.05% to 1.0% by mass of Li in terms of $Li_2CO_3$ be contained, in combination with Si, without a great decrease in initial permeability, the density can be improved greatly and the density of $4.95 \times 10^3$ $kg/m^3$ or more can be obtained. From the viewpoint of achieving a high density and high permeability, the Li content is 0.2% to 0.8% by mass in terms of $Li_2CO_3$ is more preferable. When such the Li content range is applied, the effect of improving permeability exerted by containing Li is exhibited and the initial permeability is increased when compared with the case of containing no Li. The Li content range described above is preferable when the initial permeability of 15 or more is to be obtained. The Li content of 0.4% to 0.6% by mass in terms of $Li_2CO_3$ is more preferable. When such the Li content range is applied, the effect of improving permeability exerted by containing Li is further enhanced. The Li content range described above is preferable when the initial permeability of 19 or more is to be obtained. Moreover, it is preferable that the main components in which Li is made to be contained are composed of 17 mol % to 21 mol % of BaO, 6 mol % to 13 mol % of CoO, and the remainder being $Fe_2O_3$. If the content of BaO is less than 17 mol %, it becomes difficult to obtain the high density and initial permeability even by the addition of Li, and if the content of BaO exceeds 21 mol %, a large amount of phases other than a spinel phase occur, which causes the initial permeability to be lowered greatly. It is preferable that, from the viewpoint of obtaining high density and high initial permeability, the content of BaO is 17.7 mol % to 21 mol % which is richer in Ba compared with a stoichiometric composition. If the content of CoO is less than 6 mol %, the initial permeability and high frequency characteristics that Z-type ferrite has are lowered and, if the content of CoO exceeds 13 mol %, a large amount of secondary phases occur due to the addition of Li, which causes the initial permeability to be lowered.

Moreover, it is preferable in the present invention that a ratio of the spinel-type ferrite phase to entire phases including the Z-type ferrite phase and spinel-type ferrite phase in the sintered body is 5% or less in terms of a ratio of an area to a cross section of the sintered body. This is based on new knowledge that containing of Li is accompanied by the generation of a spinel-type ferrite phase. That is, the inventor has also found that, though the density is increased by the containing of Li, the initial permeability does not simply change even by the increase of the Li content even if Si is made to be contained in combination with Li, which is caused by the generation of the spinel-type ferrite phase. In other words, the generation of the spinel-type ferrite phase increases with the increase of the Li content. The increase in the generation of the spinel-type ferrite phase leads to a decrease in the initial permeability and, therefore, the production of the spinel-type ferrite must be suppressed. Moreover, the generation of the spinel-type ferrite phase depends on compositions of the main components. This is described in detail later. The ratio (hereinafter, also called of "Vfs") of the spinel-type phase in a sintered body is calculated based on area fraction in a cross section of the sintered body and is preferably 5% or less. When the "Vfs" is 5% or less, high initial permeability and excellent frequency characteristics can be made to be exhibited. On the other hand, if the "Vfs" exceeds 5%, the decrease in the initial permeability becomes great, causing the initial permeability to be less than 14. It is more preferable that, by making the "Vfs" be 4% or less, the initial permeability of 15 or more can be obtained.

Also, when the main components are composed of 18.2 mol % to 19.8 mol % of BaO, 8 mol % to 11.5 mol % of CoO, and the remainder being $Fe_2O_3$, the "Vfs" can be made to be 2% or less. In order to make the "Vfs" be lowered and to obtain high permeability, the CoO content is more preferably 9 mol % to 10 mol %. By making the composition of main components be within the above range, even when Li is contained, the generation of the spinel-type ferrite phase is suppressed greatly and it is possible to make the "Vfs" be 0.3% or less. This means that high permeability can be obtained easily. This is based on new knowledge that, when the composition of main components is very poor in Co compared with a stoichiometric composition, even if Li is added, the spinel-type ferrite phase is generated hard. The reason is assumed as follows. That is, Li is solid-soluble in the Z-type ferrite phase and, at the time point, while a balance in the number of valences between $Li^+$ and $Fe^{3+}$ is kept and the divalent state of $Li^+$ and $Fe^3$ is maintained. At this time, if an amount of Co is large, the Co having a divalent ion is discharged and a spinel phase being rich in Co is generated. However, it is assumed that, if the composition of the main components is poor in Co, their divalent ions are originally occupied partially by cations other than Co as divalent ions and, in this case, even if Li is added, the cations other than Co are changed from their divalent state to a trivalent state with priority being assigned, without Co being discharged, the generation of the spinel phase is suppressed. As a result, a composition region in which the spinel-type ferrite phase is generated hard spreads on a region side where the composition is poor in Co.

In order to apply the ferrite sintered body to, for example, devices to be used in high frequency environments, it is desirable that volume resistivity is made more higher. The inventor has also found that, by further adding an appropriate amount of divalent metal ions simultaneously at time of the mixing, volume resistivity is improved. The reason why the addition of the divalent metal ions is attributable to high resistance of the ferrite sintered body is assumed to be that a metal exhibiting a valence of +2 substitutes a site where $Fe^{+2}$ is generated, with priority being assigned, and, as a result, the generation of $Fe^{2+}$ is suppressed. That is, the addition of these divalent metal ions serves to increase resistance of an entire ferrite sintered body mainly due to an increase in intragranular resistance.

The inventor has found that, by making 0.05% to 5% by mass of Mn, in particular, in terms of $Mn_3O_4$ be contained as divalent metal ions, volume resistivity can be greatly improved. The $Mn_3O_4$ exerts an effect of improving initial permeability. It is assumed that this has occurred due to reasons that Mn has entered in Z-phase crystal lattices and magnetic anisotropy has changed. By composing the ferrite sintered body as above, it is made possible to provide a ferrite sintered body having initial permeability "μi" being 15 or more and volume resistivity "ρ" of $10^4$ Ω·m or more. By making Mn, Si, and Li be contained in combination in particular, a ferrite sintered body having high density, high permeability, high resistance together can be obtained. In the above composition, even a small content of $Mn_3O_4$ serves to increase the volume resistivity, however, if its content is less than 0.05% by mass, substantial effects cannot be exerted. On the other hand, as the content of $Mn_3O_4$ increases, the volume resistivity is made high, however, if its content exceeds 5% by mass, the density is lowered remarkably, which means sintering becomes hard. When Si and Li are made to be contained in combination, in addition to the effect of Si, that is the volume resistivity already exhibits a very high value and, in this case, the effect of improving the initial permeability in particular is confirmed. From the viewpoint of obtaining high permeability while maintaining high volume resistivity and high density, the content of $Mn_3O_4$ is more preferably 2% to 4% by mass and most preferably 2.5% to 3.5% by mass.

By making a divalent metal ion typified by Mn described above or Li be contained, a ratio of $Fe^{2+}$ to an entire amount of irons decreases and, therefore, by controlling their contents, the ratio of $Fe^{2+}$ to the entire amount of irons can be reduced to 0.2% or less. By making the composition of main components be contained within the range defined by the present invention, for example, the composition of 17 mol % to 21 mol % of BaO, 6 mol % to 13 mol % of CoO, the remainder being $Fe_2O_3$, and by making the initial permeability be 14 or more, and by making the ratio of $Fe^{2+}$ to the contained entire amount of iron be 0.2% or less, hexagonal Z-type ferrite having high permeability, high resistance and being excellent in high frequency characteristics can be provided. More preferably, by making the ratio of $Fe^{2+}$ be 0.05% or less, the volume resistivity of $10^4$ Ω·m or more can be obtained.

The present invention can be suitably used for obtaining the ferrite sintered body having density of $4.95 \times 10^3$ $kg/m^3$ or more, initial permeability of 14 or more, and volume resistivity of $10^4$ Ω·m or more and it is desirable that the ferrite sintered body has these characteristics in order to provide electronic components that can be used in high frequency environments. When the composition of the main components is made to be within the range of the present invention, for example, when 17 mol % to 21 mol % of BaO, 6 mol % to 13 mol % of CoO, and the remainder being $Fe_2O_3$ are contained and when the sintered body contains 0.05% to 1.0% by mass of Li in $Li_2CO_3$ terms of, 0.05% to 5% by mass of Mn in terms of $Mn_3O_4$, and 0.05% to 0.5% by mass of Si in terms of $SiO_2$, it is made possible to obtain high performance of providing the density of $4.95 \times 10^3$ $kg/m^3$ or more, initial permeability μi of 14 or more, and volume resistivity ρ of $10^4$ Ω·m or more and, moreover, by making 0.2% to 0.3% by mass of Li in terms of $Li_2CO_3$ be contained, the initial permeability μi of 15 or more can be obtained and the ferrite sintered body that can be suitably used for electronic devices in high frequency application can be made available.

The ferrite sintered body of the present invention, unless otherwise defined in the present invention, can be manufactured by an ordinary powder-metallurgical method. However, when a ferrite sintered body contains 17 mol % to 21 mol % of BaO, 6 mol % to 13 mol % of CoO, and the remainder being $Fe_2O_3$ as main components and also contains 0.05% to 1.0% by mass of Li, based on the main components, in $Li_2CO_3$ and 0.05% to 0.5% by mass of Si, based on the main components in terms of $SiO_2$, if a calcination temperature is lowered, the rate of "Vfs" of the spinel-type ferrite in the sintered body to be obtained finally increases. By making the calcination temperature be 900° C. or higher, the rate "Vfs" can be made to be 5% or less, however, to obtain the initial permeability of 15 or more, it is preferable that the calcination temperature is 950°

C. or higher. On the other hand, if the calcination temperature exceeds 1150° C., crystal grain size of a sintered body becomes smaller and the initial permeability is lowered, which makes it difficult to obtain the initial permeability of 15 or more. Therefore, from the viewpoint of obtaining high permeability, it is preferable that the calcination temperatures is 950° C. to 1150° C. Depending on the calcination temperature, a change occurs in composing phases of a material powder obtained after calcination among M-type hexagonal ferrite, Y-type hexagonal ferrite, Z-type hexagonal ferrite, $BaFe_2O_4$, spinel phase, or the like, however, if the material powder obtained after calcination is substantially made of two phases consisting of the hexagonal M-type ferrite phase and the hexagonal Y-type ferrite phase in particular, great effects of improving the initial permeability of the sintered body appear. The reason for this is assumed to be that growth of Z-phase crystal grains is promoted by a reaction occurring when two phases are coupled. Moreover, it is preferable that, from the viewpoint of productivity, calcination is performed in the air.

The ferrite sintered body of the present invention can be manufactured by an ordinary powder-metallurgical method as described above and it is preferable that an oxygen concentration in the sintering atmosphere is high. By making the oxygen concentration be higher, volume resistivity is made higher. Also, the rate of the spinel-type ferrite phase is lowered. From this point of view, the oxygen concentration is preferably 20 vol % or more and sintering is preferably performed in the oxygen 100% atmosphere. Also, the sintering temperature can be selected between, for example, 1260° C. and 1330° C., however, from the viewpoint of obtaining high density and high permeability, the sintering temperature is between 1280° C. to 1330° C.

Embodiments

The ferrite sintered body of hexagonal Z-type ferrite of the present invention is hereinafter described more particularly. First, weights of $Fe_2O_3$, $BaCO_3$, and $CO_3O_4$ were measured so that compositions of main components had ratios as shown in Table 1 and $Mn_3O_4$, $Li_2CO_3$, and $SiO_2$ were added respectively to the main components so that the rate of each of these additives, based on the main components, was as shown in Table 1 and the main components and these additives were mixed by using a wet ball mill for 16 hours. Moreover, the $Mn_3O_4$, $Li_2CO_3$, and $SiO_2$ may be added at time of pulverizing to be performed after calcination. Next, the mixed powders were calcined for 2 hours at 1100° C. in the air. The calcined powders were pulverized for 18 hours by the wet ball mill. Pulverized powders were added with PVA (polyvinyl alcohol) as binder and were granulated. After the granulation, the granulated powders were formed by compression so as to obtain a ring shape and, thereafter, were sintered for 3 hours at 1300° C. in oxygen atmosphere. The initial permeability and volume resistivity of the obtained ring-shaped sintered bodies having an outer diameter of 25 mm, an inner diameter of 15 mm, and a height of 5 mm, were measured at a temperature of 25° C. The initial permeability was measured at a frequency of 100 kHz by providing 20 turns of winding to the ring-shaped sintered body using an impedance gain phase analyzer 4194A (Yokogawa Hewlett Packard Co.) (hereinafter, unless otherwise defined, the initial permeability represents a value obtained by making measurement at a frequency of 100 kHz). Also, volume resistivity, average crystal grain diameter of the sintered body, and frequency characteristics of initial permeability of the sintered body were also evaluated. The volume resistivity was measured by dividing the ring-shaped sintered body into two portions at its center to coat the cut-face with a conductive dotite, using an insulation resistance tester (Advantest Co., Ltd). The frequency characteristic of the initial permeability between 10 MHz and 1.8 GHz was measured using an impedance meter 4291B (Hewlett Packard Co.). Here, the average crystal grain diameter represents a value obtained by dividing a length of a line segment on a drawn straight line being equivalent to 1 mm, by the number of crystal grains, in a microscopic observation image of a cross section of a sintered body having undergone mirror polishing and etching. Moreover, if an end of a line segment disappears in a crystal grain, the grain is counted as 0.5 pieces. The results from evaluation of the initial permeability, density, and volume resistivity are shown in Table 1.

TABLE 1

| | Main components (mol %) | | | Sub-components (% by mass) | | | μi | Density ($\times 10^3$ kg/m$^3$) | Volume resistivity ($\Omega \cdot$ m) |
|---|---|---|---|---|---|---|---|---|---|
| | $Fe_2O_8$ | BaO | CoO | $Mn_3O_4$ | $Li_2CO_3$ | $SiO_2$ | | | |
| Comparative Example 1 | 70.2 | 18.8 | 11.0 | 0 | 0 | 0 | 14.4 | 4.51 | $2.0 \times 10^1$ |
| Comparative Example 2 | 70.2 | 18.8 | 11.0 | 0 | 0.2 | 0 | 13.5 | 4.87 | $1.6 \times 10^{1'}$ |
| Comparative Example 3 | 70.2 | 18.8 | 11.0 | 0 | 0.4 | 0 | 12.3 | 4.91 | 4 |
| Comparative Example 4 | 70.2 | 18.8 | 11.0 | 0 | 0.6 | 0 | 12.8 | 4.91 | 3 |
| Embodiment 1 | 70.2 | 18.8 | 11.0 | 0 | 0.4 | 0.13 | 16.7 | 5.06 | $4.6 \times 10^4$ |
| Comparative Example 5 | 70.2 | 18.8 | 11.0 | 3.0 | 0.4 | 0 | 11.8 | 5.10 | $1.1 \times 10^4$ |
| Comparative Example 6 | 70.2 | 18.8 | 11.0 | 3.0 | 0 | 0.13 | 14.9 | 4.91 | $3.1 \times 10^4$ |
| Embodiment 2 | 70.2 | 18.8 | 11.0 | 3.0 | 0.2 | 0.13 | 17.1 | 5.06 | $2.6 \times 10^4$ |
| Embodiment 3 | 70.2 | 18.8 | 11.0 | 3.0 | 0.4 | 0.13 | 19.4 | 5.09 | $2.9 \times 10^4$ |
| Embodiment 4 | 70.2 | 18.8 | 11.0 | 3.0 | 0.6 | 0.13 | 19.4 | 5.12 | $2.9 \times 10^4$ |
| Embodiment 5 | 70.2 | 18.8 | 11.0 | 3.0 | 0.8 | 0.13 | 15.6 | 5.11 | $3.5 \times 10^4$ |
| Embodiment 6 | 70.2 | 18.8 | 11.0 | 3.0 | 1.0 | 0.13 | 14.0 | 5.11 | $2.9 \times 10^4$ |
| Comparative Example 7 | 70.2 | 18.8 | 11.0 | 3.0 | 1.2 | 0.13 | 12.7 | 5.16 | $2.4 \times 10^4$ |
| Embodiment 7 | 70.2 | 18.8 | 11.0 | 3.0 | 0.4 | 0.05 | 18.6 | 6.18 | $3.0 \times 10^4$ |
| Embodiment 8 | 70.2 | 18.8 | 11.0 | 3.0 | 0.4 | 0.1 | 18.7 | 5.10 | $3.0 \times 10^4$ |

TABLE 1-continued

| | Main components (mol %) | | | Sub-components (% by mass) | | | μi | Density ($\times 10^3$ kg/m$^3$) | Volume resistivity ($\Omega \cdot$ m) |
|---|---|---|---|---|---|---|---|---|---|
| | $Fe_2O_8$ | BaO | CoO | $Mn_3O_4$ | $Li_2CO_3$ | $SiO_2$ | | | |
| Embodiment 9 | 70.2 | 18.8 | 11.0 | 3.0 | 0.4 | 0.2 | 19.4 | 5.08 | $2.5 \times 10^4$ |
| Embodiment 10 | 70.2 | 18.8 | 11.0 | 4.0 | 0.4 | 0.13 | 19.2 | 5.05 | $2.0 \times 10^4$ |
| Embodiment 11 | 71.2 | 18.2 | 10.6 | 3.0 | 0.4 | 0.13 | 15.1 | 5.05 | $3.9 \times 10^4$ |
| Embodiment 12 | 69.3 | 19.8 | 10.9 | 3.0 | 0.4 | 0.13 | 16.6 | 5.14 | $4.7 \times 10^4$ |
| Embodiment 13 | 69.4 | 18.6 | 12.0 | 3.0 | 0.4 | 0.13 | 17.3 | 5.15 | $4.0 \times 10^4$ |
| Embodiment 14 | 70.4 | 17.9 | 11.7 | 3.0 | 0.4 | 0.13 | 15.8 | 5.11 | $4.2 \times 10^4$ |
| Embodiment 15 | 70.5 | 19.5 | 10.0 | 3.0 | 0.4 | 0.13 | 19.9 | 5.12 | $4.2 \times 10^4$ |
| Embodiment 16 | 69.8 | 18.7 | 11.5 | 3.0 | 0.4 | 0.13 | 19.2 | 5.13 | $4.0 \times 10^4$ |
| Embodiment 17 | 71.0 | 19.0 | 10.0 | 3.0 | 0.4 | 0.13 | 20.3 | 5.08 | $4.3 \times 10^4$ |
| Embodiment 18 | 71.8 | 19.2 | 9.0 | 3.0 | 0.4 | 0.13 | 19.7 | 5.07 | $3.6 \times 10^4$ |
| Embodiment 19 | 72.5 | 19.5 | 8.0 | 3.0 | 0.4 | 0.13 | 17.0 | 5.03 | $1.9 \times 10^4$ |
| Embodiment 20 | 71.0 | 20.0 | 9.0 | 3.0 | 0.4 | 0.13 | 19.8 | 5.11 | $1.6 \times 10^4$ |
| Embodiment 21 | 70.0 | 20.0 | 10.0 | 3.0 | 0.4 | 0.13 | 18.3 | 5.12 | $2.2 \times 10^4$ |
| Embodiment 22 | 68.7 | 21.0 | 10.3 | 3.0 | 0.4 | 0.13 | 14.2 | 5.17 | $1.6 \times 10^4$ |
| Embodiment 23 | 68.6 | 18.4 | 13.0 | 3.0 | 0.4 | 0.13 | 15.3 | 5.15 | $3.4 \times 10^4$ |
| Comparative Example 8 | 74.9 | 20.1 | 5.0 | 3.0 | 0.4 | 0.13 | 3.0 | 5.03 | $1.8 \times 10^4$ |
| Comparative Example 9 | 67.8 | 18.2 | 14.0 | 3.0 | 0.4 | 0.13 | 12.3 | 5.17 | $2.9 \times 10^4$ |
| Comparative Example 10 | 71.9 | 16.8 | 11.3 | 3.0 | 0.4 | 0.13 | 8.0 | 5.01 | $2.7 \times 10^4$ |
| Comparative Example 11 | 67.6 | 21.8 | 10.6 | 3.0 | 0.4 | 0.13 | 10.8 | 5.22 | $1.0 \times 10^4$ |

TABLE 2

| | Main components (mol %) | | | Sub-components (% by mass) | | | μi | Density ($\times 10^3$ kg/m$^3$) | Average crystal grain diameter (μm) |
|---|---|---|---|---|---|---|---|---|---|
| | $Fe_2O_8$ | BaO | CoO | $Mn_3O_4$ | $Li_2CO_3$ | $SiO_2$ | | | |
| Comparative Example 1 | 70.2 | 18.8 | 11.0 | 0 | 0 | 0 | 14.4 | 4.51 | 19 |
| Comparative Example 3 | 70.2 | 18.8 | 11.0 | 0 | 0.4 | 0 | 12.3 | 4.91 | 13 |
| Embodiment 1 | 70.2 | 18.8 | 11.0 | 0 | 0.4 | 0.13 | 16.7 | 5.06 | 24 |
| Comparative Example 5 | 70.2 | 18.8 | 11.0 | 3.0 | 0.4 | 0 | 11.8 | 5.10 | 11 |
| Comparative Example 6 | 70.2 | 18.8 | 11.0 | 3.0 | 0 | 0.13 | 14.9 | 4.91 | 38 |
| Embodiment 2 | 70.2 | 18.8 | 11.0 | 3.0 | 0.2 | 0.13 | 17.1 | 5.06 | 46 |
| Embodiment 3 | 70.2 | 18.8 | 11.0 | 3.0 | 0.4 | 0.13 | 19.4 | 5.09 | 58 |
| Comparative Example 7 | 70.2 | 18.8 | 11.0 | 3.0 | 1.2 | 0.13 | 12.7 | 5.16 | 35 |

As shown in Table 1, Comparative Examples 1 to 4 show that, even if $Li_2CO_3$ is contained singly, as its content increases, density is improved and when content of $Li_2CO_3$ is 0.2% by mass or more, the density of $4.87 \times 10^3$ kg/m$^3$ or more can be obtained. However, though the density increased, the initial permeability decreased with the increase of $Li_2CO_8$. On the other hand, in Embodiment 1, by making 0.13% by mass of $SiO_2$ be contained, the initial permeability exceeds 14 and volume resistivity becomes $10^4$ Ω·m or more and containing of $SiO_2$ is effective in improving both initial permeability and volume resistivity. As shown in Table 1 (Embodiments 2 to 6), if $SiO_2$ is made to be contained in combination, the density is improved with the increase in the content of $Li_2CO_3$ and the initial permeability is also improved. Results from Embodiments 2 to 6 in which Li content is changed show that the initial permeability is 14 or more. When $SiO_2$ is made to be contained and the content of $Li_2CO_3$ is 0.2% by mass or more, the density of $5.00 \times 10^3$ kg/m$^3$ or more can be obtained. The initial permeability increased until the content of $Li_2CO_3$ became 0.6% by mass and, in a range of the $Li_2CO_3$ content of 0.2% to 0.8% by mass, the initial permeability increased by 0.7 or more compared with the case of containing no Li (Comparative example 6). Table 1 shows that the initial permeability of 15 or more could be obtained. In particular, in a range of the $Li_2CO_3$ content of 0.4% to 0.6% by mass, the initial permeability increased by 4.5 or more compared with the case of containing no Li (Comparative example 6). Table 1 shows that the initial permeability of as very high as 19 or more was obtained. Moreover, the volume resistivity of $10^4$ Ω·m or more could be obtained in any case of Embodiments 7 to 10. In Embodiments 7 to 10, when the content of $SiO_2$ is 0.05% to 0.2% by mass, the initial permeability is as high as 18 or more and, in particular, in a range of the $SiO_2$ content of 0.13% to 0.2% by mass, the initial permeability of as very high as 19 or more was obtained.

On the other hand, evaluation results of average crystal grain diameters of the sintered body are shown in Table 2. Table 2 shows that, when Li was made to be singly contained, an average crystal grain diameter of the sintered body was made small and the initial permeability was low. On the other hand, Table 2 also shows that, when Si was made to be contained in combination, the average crystal grain diameter of the sintered body was made large and the initial permeability was improved. When the average crystal grain diameter of a sample is 20 μm or more, more specifically, in a sample within a range of the average crystal grain diameter of 24 μm to 58 μm (Embodiments 1 to 3), the effect of containing Li comes to be exerted and the initial permeability of 14 or more and the density of $5.00 \times 10^3$ kg/m$^3$ or more could be obtained.

Also, as shown in Comparative Example 5, even if Mn, in addition to Li, is made to be contained, an average crystal grain diameter of the sintered body remains small and initial permeability remains low. That is, it is understood that a phenomenon in which an average crystal grain diameter of a sintered body is made large and an effect of improving initial permeability is exerted by containing Li represents an effect achieved by making Li be contained in combination with Si. Even if Mn is made to be contained in combination with Li, an effect of improving the initial permeability is not obtained, however, by making Mn be contained in combination with Si and Li, the effect of improving the initial permeability was exerted. In particular, in Embodiments 3, 4, 9 and 10 in which the content of $Mn_3O_4$ is 3% to 4% by mass, the initial permeability is 19 or more and high initial permeability, high density, and high volume resistivity were obtained.

Figure 2:
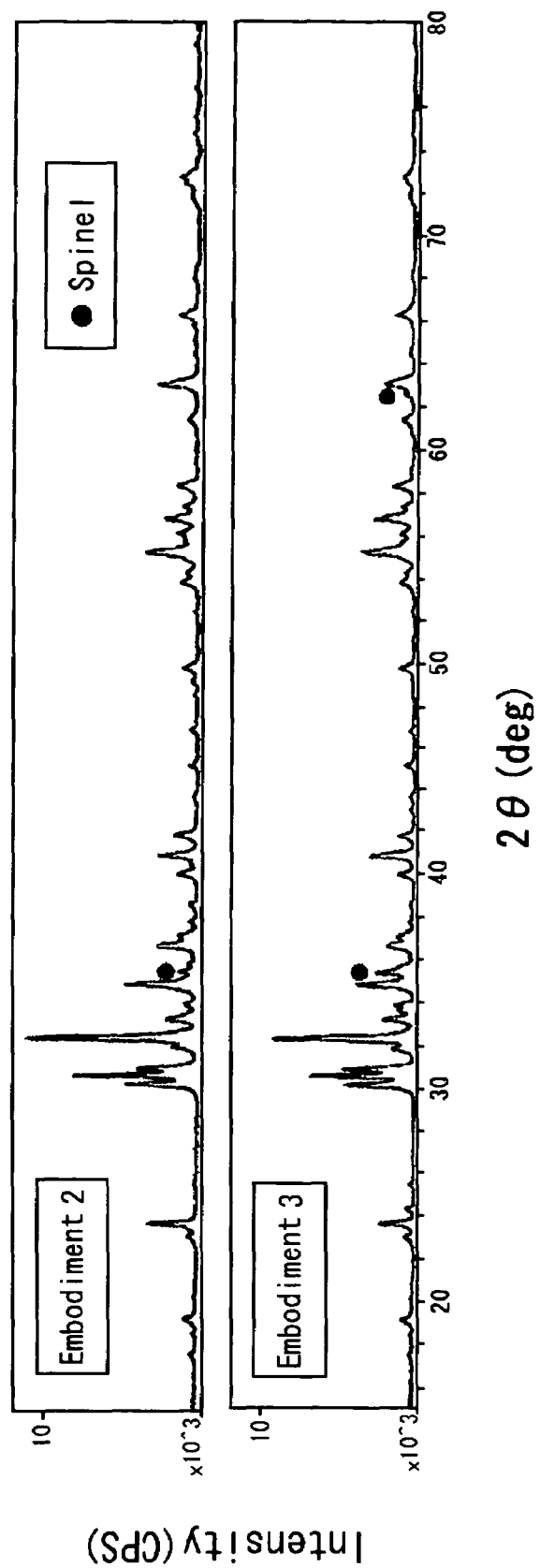
FIG. 2 is a diagram showing an X-ray diffraction pattern according to the embodiment of the present invention.
Figure 3:
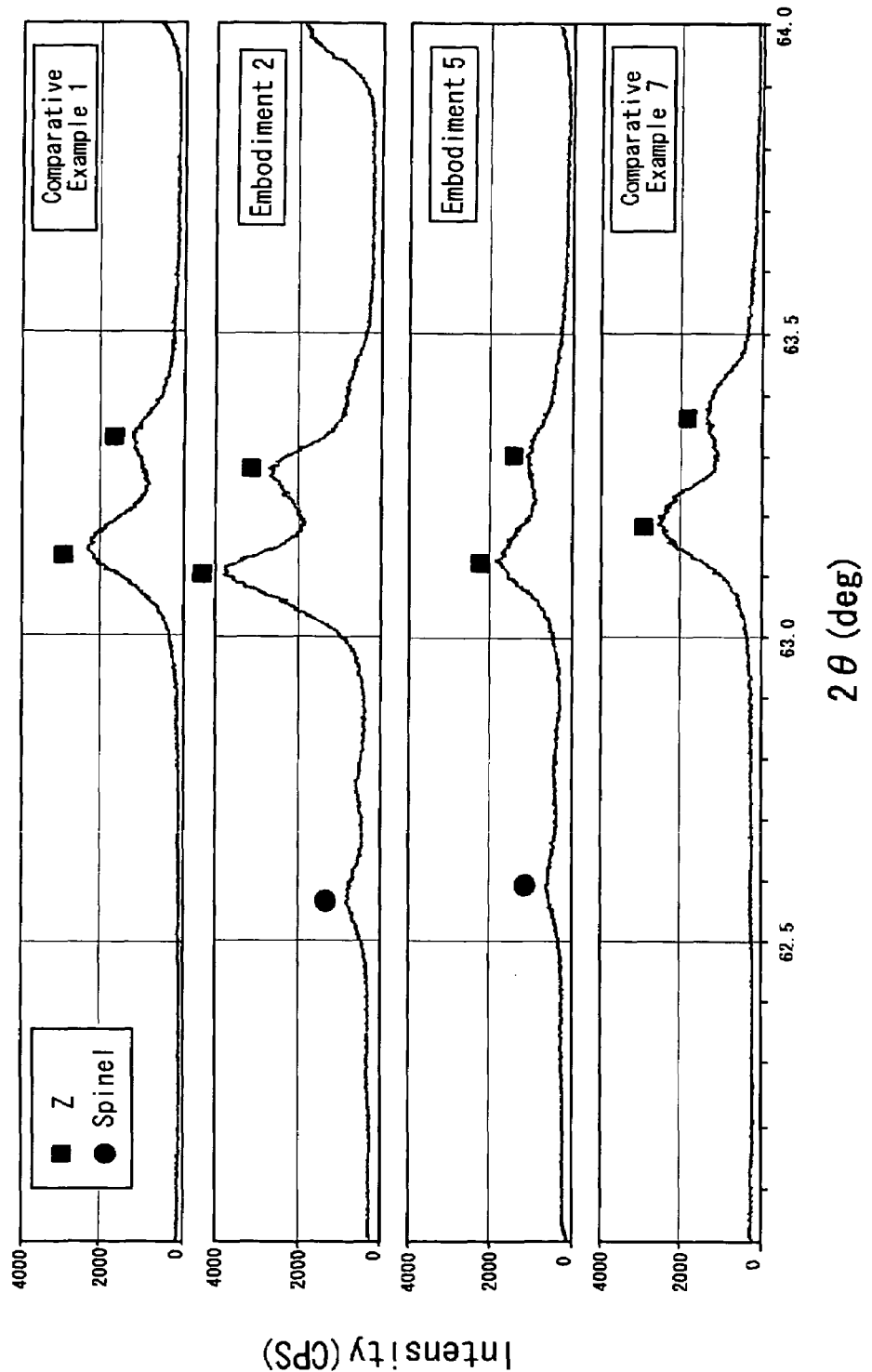
FIG. 3 is a diagram showing an X-ray diffraction pattern according to the embodiment and comparative example of the present invention.
Figure 4:
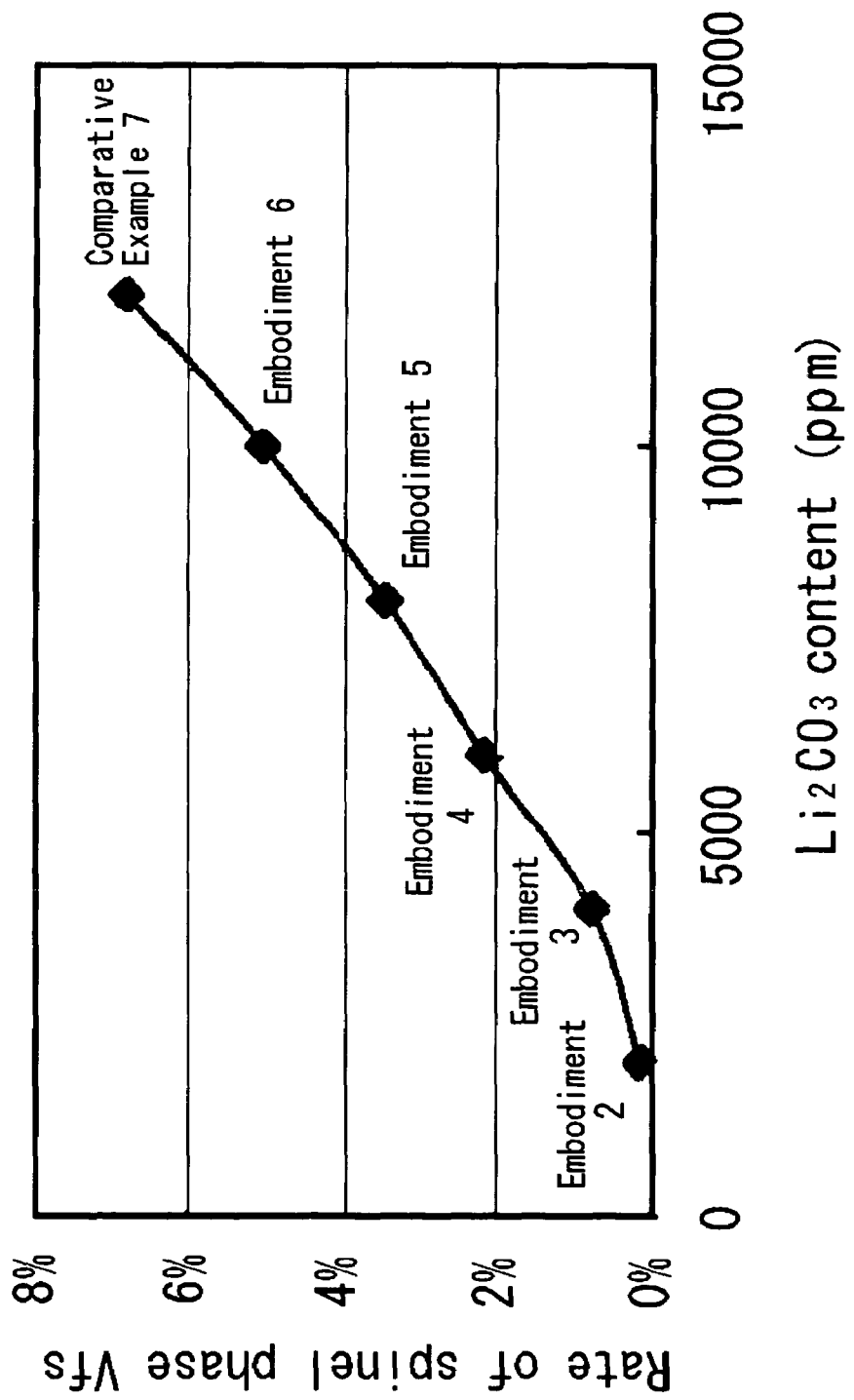
FIG. 4 is a diagram showing a relation between a content of $Li_2CO_3$ and a rate of a spinel phase according to the embodiment of the present invention.

From the above description, it is made clear that, by making $Li_2CO_3$ be contained in combination with $SiO_2$, it is possible to enhance density and permeability of sintered bodies of hexagonal Z-type ferrite. Results from a study of generation of secondary phases by X-ray diffractometry are shown in FIGS. 1 through 3. FIG. 2 shows results of X-ray diffraction pattern obtained in the Embodiments 2 and 3. FIG. 3 shows part of a magnified X-ray diffraction pattern obtained in the Embodiments 2 and 5, and in the Comparative Examples 1 and 7. The results show that a spinel-type ferrite phase was generated in the sample containing a high amount of $Li_2CO_3$, namely, in each of the Embodiments 2, 3 and 5. Moreover, FIG. 1 shows an SEM photograph of a sample used in the Embodiment 3 as an example of the SEM observation result. Black portions corresponds to the spinel-type ferrite phase (indicated by arrows 1) and gray portions corresponds to a Z-type ferrite phase (indicated by an arrow 2). Herein, regarding the Embodiments 2 to 6 and the Comparative Example 7, an area ratio of a spinel-type ferrite phase to entire phases including the Z-type ferrite phase and the spinel-type ferrite phase was measured and the result from the study of a change in the ratio of the spinel-type ferrite phase by a content of $Li_2CO_3$ is shown in a graph of FIG. 4. Namely, FIG. 4 shows a broken line graph fabricated by plotting a generating rate of a spinel phase with respect to a content of $Li_2CO_3$ regarding the Embodiments 2 to 6 and the Comparative Example 7, respectively. Moreover, the above area ratio was calculated based on the Z-type ferrite phase and spinel-type ferrite phase, and portions other than those such as a cavity or the like were excluded. The graph of FIG. 4 teaches substantially linear increase of the ratio of the spinel-type ferrite phase with the increase in the content of $Li_2CO_3$. The results shown in FIG. 4 and Table 1 indicate that, if the ratio of the spinel-type ferrite phase is 5% or less like the Embodiments 2 to 6, the initial permeability μi of 14 or more can be obtained and, if the ratio of the spinel-type ferrite phase is 4% or less like the Embodiments 2 to 5, the initial permeability μi of 15 or more can be obtained. By combining effect of the improvement of the initial permeability obtained by the increase in the density induced by containing Li with influence by a decrease in the initial permeability caused by the generation of the spinel-type ferrite phase, if the Li content is 0.2% to 0.6% by mass (2000 ppm to 6000 ppm) and the ratio of the spinel-type ferrite phase is 0.2% to 2.2% (in the case of the Embodiments 2 to 4), the initial permeability of 17 or more can be obtained.

Moreover, as shown in Table 1, if a sample containing 17.9 mol % to 21 mol % of BaO, 8 mol % to 13 mol % of CoO, the remainder being $Fe_2O_3$ as its main components, which is within the range defined in the composition of the main components of the present invention, contains 0.2% to 1.0% by mass, based on the main components, in terms of $Li_2CO_3$ and contains 0.05% to 0.2% by mass of $SiO_2$ like the Embodiments 1 to 23, high performance of the density of $5.03 \times 10^3$ kg/m$^3$ or more, initial permeability of 14 or more and volume resistivity of $1.6 \times 10^4$ Ω·m or more can be obtained. Also, the result from a study of the ratio of the spinel-type ferrite phase is shown in Table 3. As shown in Table 3, in the Embodiments 11, 12, and 15 to 19 in which the BaO content was 18.2 mol % to 19.8 mol % and the CoO content was 8 mol % to 11.5 mol %, the "Vfs" became 2% or less. In particular, in the Embodiments 15, 17, and 18 in which the BaO content was 18.2 mol % to 19.8 mol %, the CoO content was 9 mol % to 10 mol %, the "Vfs" became 0.3% or less and the initial permeability of as high as 19 or more were obtained. Moreover, it was found that, in the Comparative Examples 8 to 11 in which the composition of the main components is out of the range defined in the present invention, the initial permeability becomes as low as less than 13, as shown in Table 1.

TABLE 3

| | Main components (mol %) | | | Sub-components (% by mass) | | | | Density | Rate of spinel-type ferrite phase |
|---|---|---|---|---|---|---|---|---|---|
| | $Fe_2O_3$ | BaO | CoO | $Mn_3O_4$ | $Li_2CO_3$ | $SiO_2$ | μi | ($\times 10^3$ kg/m$^3$) | Vfs (%) |
| Embodiment 11 | 71.2 | 18.2 | 10.6 | 3.0 | 0.4 | 0.13 | 15.1 | 5.05 | 1.9 |
| Embodiment 12 | 69.3 | 19.8 | 10.9 | 3.0 | 0.4 | 0.13 | 16.6 | 5.14 | 0 |
| Embodiment 13 | 69.4 | 18.6 | 12.0 | 3.0 | 0.4 | 0.13 | 17.3 | 5.15 | 2.3 |
| Embodiment 14 | 70.4 | 17.9 | 11.7 | 3.0 | 0.4 | 0.13 | 15.8 | 5.11 | 2.2 |
| Embodiment 15 | 70.5 | 19.5 | 10.0 | 3.0 | 0.4 | 0.13 | 19.9 | 5.12 | 0 |
| Embodiment 16 | 69.8 | 18.7 | 11.5 | 3.0 | 0.4 | 0.13 | 19.2 | 5.13 | 1.5 |
| Embodiment 17 | 71.0 | 19.0 | 10.0 | 3.0 | 0.4 | 0.13 | 20.3 | 5.08 | 0.3 |
| Embodiment 18 | 71.8 | 19.2 | 9.0 | 3.0 | 0.4 | 0.13 | 19.7 | 5.07 | 0 |

TABLE 3-continued

|  | Main components (mol %) | | | Sub-components (% by mass) | | | μi | Density (× 10³kg/m³) | Rate of spinel-type ferrite phase Vfs (%) |
|---|---|---|---|---|---|---|---|---|---|
|  | $Fe_2O_3$ | BaO | CoO | $Mn_3O_4$ | $Li_2CO_3$ | $SiO_2$ | | | |
| Embodiment 19 | 72.5 | 19.5 | 8.0 | 3.0 | 0.4 | 0.13 | 17.0 | 5.03 | 0 |
| Comparative Example 8 | 74.9 | 20.1 | 5.0 | 3.0 | 0.4 | 0.13 | 3.0 | 5.03 | 0 |
| Comparative Example 9 | 67.8 | 18.2 | 14.0 | 3.0 | 0.4 | 0.13 | 12.3 | 5.17 | 4.6 |

Moreover, a ratio of $Fe^{2+}$ to an entire amount of iron contained in the sample used in the above Comparative Examples 6 and 7 and Embodiments 2 to 6 shown in Table 1 was studied. An amount of $Fe^{2+}$ was determined by dissolving the sintered body in strong phosphoric acid and titrating the dissolved solution with a potassium bichromate standard solution using diphenyl-4-sulfonic sodium as an indicator. Also, a total amount of Fe was determined by dissolving the sample in hydrochloric acid and by oxidizing $Fe^{2+}$ in Fe ($Fe^{2+}$ and $Fe^{2+}$) with hydrogen peroxide to make all the $Fe^{2+}$ be $Fe^{3+}$ and by reducing $Fe^{3+}$ to $Fe^{2+}$ with stannous chloride and then by titrating the sample solution with the potassium bichromate standard solution. As a result, $Fe^{2+}$ being 0.04% by mass or more was not detected in any sample. Accordingly, it is understood that if the rate of the spinel-type ferrite phase is within the range (less than 7%) as shown in the graph of FIG. 4, a deviation in composition that leads to generation of $Fe^{2+}$ does not occurs.

Samples were produced by calcinating the composition used in the next Embodiment 3 in the air at different calcination temperatures and by changing only conditions for calcination. The characteristic of the composition is shown in Table 4. As shown in Table 4, in the range of calcination temperatures of 900° C. to 1200° C., the initial permeability of 14 or more and the "Vfs" of 5% or less can be obtained and, in samples of which the calcination temperature is 1000° C. to 1100° C. which is within a range defined in the present invention in particular, the initial permeability of 15 or more and the "Vfs" of 2% or less could be obtained. Moreover, if the calcination temperature is 900° C., the rate of the spinel-type ferrite phase is high and, as a result, high initial permeability of 15 or more cannot be obtained. On the other hand, if the calcination temperature reaches 1200° C., the average crystal grain diameter of the sintered body becomes too small, such as 10 μm, and high permeability of 15 or more cannot be obtained. Based on these described above, it is desirable that the calcination temperature is 950° C. to 1150° C. The result from determination of a phase being generated in a state of calcined powder by using the X-ray diffraction pattern is shown in Table 4. In the case of the calcination temperature 1100° C., where the initial permeability of 19 or more is obtained in particular, that is, the magnetic characteristic is higher, material powder after calcination has two phases including M-type and Y-type ferrite, and the result teaches generated phase having the two-phase composition is effective in improving the initial permeability in particular.

TABLE 4

| Calcination temperature (° C.) | Initial permeability | Rate of spinel-type ferrite phase Vfs (%) | Average crystal grain diameter (μm) | Generated Phase |
|---|---|---|---|---|
| 900 | 14.7 | 4.1 | 28 | M-type, $BaFe_2O_4$, Spinel phase |
| 1000 | 15.6 | 1.9 | 31 | M-type, Y-type, $BaFe_2O_4$, Spinel phase |
| 1100 | 19.4 | 0.8 | 59 | M-type, Y-type |
| 1200 | 14.4 | 0.8 | 10 | M-type, Y-type, Z-type |

Figure 5:
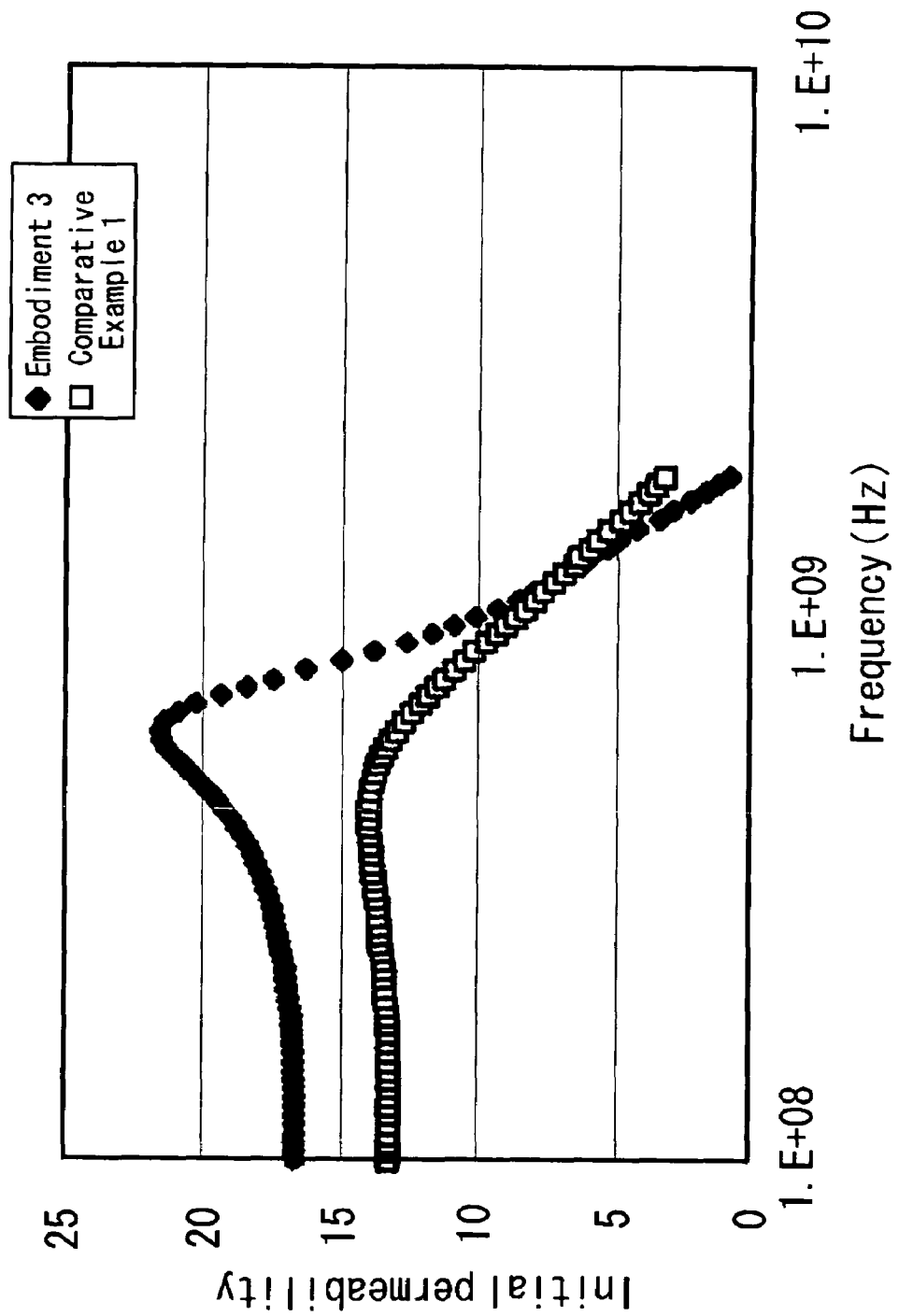
FIG. 5 is a diagram showing frequency dependency of an initial permeability according to the embodiment and comparative example of the present invention.

Further, as shown in Table 1, the samples used in the Embodiments of the present invention, by making Mn and Si be contained in a range of the present invention, exhibits high volume resistivity when compared with the case (Comparative Examples 1 to 4) in which Mn and Si are not contained. Moreover, results from measurement of frequency dependency of initial permeability of samples used in the Embodiment 3 and Comparative Example 1 are shown in the graph of FIG. 5. In the sample used in Embodiment 3, high permeability is maintained in a high frequency range and a frequency at which the permeability begins to decrease is high when compared with the Comparative Example in which Li, Si and Mn are not contained. This means that the ferrite sintered body of the present invention is excellent in a frequency characteristic.

As mentioned above with the various embodiments, according to the present invention, the ferrite sintered body is provided which has a high density and is excellent in initial permeability, high-frequency characteristics, volume resistivity. By using the ferrite sintered body of the present invention, it is made possible to provide a choke coil, an inductor, an electromagnetic wave absorber, or the like, all being able to achieve high initial permeability and having high quality.

Further, according to the present invention, a method that can be suitably used in manufacturing the ferrite sintered body of the hexagonal Z-type ferrite having high initial permeability and that can suppress growth of a spinel phase can be provided.

It is apparent that the present invention is not limited to the above embodiments but may be changed and modified without departing from the scope and spirit of the invention.

What is claimed is:

1. A ferrite sintered body of hexagonal Z-type ferrite comprising:
   17 mol % to 21 mol % of BaO, 6 mol % to 13 mol % of CoO, and the remainder being $Fe_2O_3$ as its main components;

0.05% to 1.0% by mass of Li, based on said main components, in terms of $Li_2CO_3$; and 0.05% to 0.5% by mass of Si, based on said main components, in terms of $SiO_2$.

2. The ferrite sintered body as claimed in claim 1, wherein a rate of a spinel-type ferrite phase to entire phases consisting of a Z-type ferrite phase and a spinel-type ferrite phase in the ferrite sintered body is 5% or less in terms of an area ratio in a cross-section of said ferrite sintered body.

3. The ferrite sintered body as claimed in claim 2, wherein initial permeability μi at a frequency of 100 kHz is 14 or more.

4. The ferrite sintered body as claimed in claim 2, wherein the rate of said spinel-type ferrite phase is 4% or less in terms of the area ratio.

5. The ferrite sintered body as claimed in claim 4, wherein initial permeability μi at a frequency of 100 kHz is 15 or more.

6. The ferrite sintered body as claimed in claim 1, wherein said main components comprise 18.2 mol % to 19.8 mol % of BaO, 8 mol % to 11.5 mol % of CoO, and the remainder being $Fe_2O_3$.

7. The ferrite sintered body as claimed in claim 6, wherein said main components comprise 18.2 mol % to 19.8 mol % of BaO, 9 mol % to 10 mol % of CoO, and the remainder being $Fe_2O_3$.

8. The ferrite sintered body as claimed in claim 1, wherein the content of Si in terms of $SiO_2$ is 0.05% to 0.2% by mass.

9. The ferrite sintered body as claimed in claim 1, wherein the content of Li in terms of $Li_2CO_3$ is 0.2% to 0.8% by mass.

10. The ferrite sintered body as claimed in claim 9, wherein the content of Li in terms of $Li_2CO_3$ is 0.4% to 0.6% by mass.

11. The ferrite sintered body as claimed in claim 1, wherein density of said ferrite sintered body is $4.95 \times 10^3$ kg/m³ or more.

12. The ferrite sintered body as claimed in claim 1, wherein an average crystal grain diameter in a cross section of said sintered body is 20 μm or more.

13. The ferrite sintered body as claimed in claim 1, wherein said ferrite sintered body comprises 0.05% to 5% by mass of Mn, based on said main components, in terms of $Mn_3O_4$.

14. The ferrite sintered body as claimed in claim 1, wherein initial permeability μi at a frequency of 100 kHz is 15 or more and volume resistivity ρ is $10^4$ Ω·m or more.

15. The ferrite sintered body as claimed in claim 13, wherein said ferrite sintered body comprises 2% to 4% by mass of Mn, based on said main components, in terms of $Mn_3O_4$.

16. The ferrite sintered body as claimed in claim 1, wherein a ratio of $Fe^{2+}$ to the entire amount of irons is 0.2% or less.

17. A method of manufacturing a ferrite sintered body comprising:

a calcination process to calcine mixed material powder;

a powder pulverizing process to pulverize calcined powder obtained in said calcined process;

a forming process to form pulverized powder obtained in said powder pulverizing process; and a sintering process to sinter a green compacts obtained in said forming process so that a sintered body of hexagonal Z-type ferrite is obtained;

wherein said ferrite sintered body contains 17 mol % to 21 mol % of BaO, 6 mol % to 13 mol % of CoO, the remainder being $Fe_2O_3$ as its main components and contains 0.05% to 1.0% by mass of Li, based on said main components, in terms of $Li_2CO_3$ and 0.05% to 0.5% by mass of Si, based on said main components, in terms of $SiO_2$ and wherein said calcination process is performed at temperatures of 950° C. to 1150° C.

18. The method of manufacturing the ferrite sintered body as claimed in claim 17, wherein said calcined powder obtained in said calcination process has substantially two phases consisting of a hexagonal M-type ferrite phase and a hexagonal Y-type ferrite phase.

* * * * *